(12) United States Patent
Uenuma et al.

(10) Patent No.: US 8,447,468 B2
(45) Date of Patent: May 21, 2013

(54) ELECTRICALLY-POWERED ACTUATOR DRIVING CONTROL APPARATUS AND DRIVING CONTROL METHOD AND VEHICLE HAVING ELECTRICALLY-POWERED ACTUATOR DRIVING CONTROL APPARATUS

(75) Inventors: Kenya Uenuma, Yokohama (JP); Tadashi Tamasho, Fujisawa (JP); Masatsugu Yokote, Yokohama (JP); Takuma Suzuki, Yokohama (JP); Yosuke Yamaguchi, Atsugi (JP); Masato Takehi, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 314 days.

(21) Appl. No.: 12/935,619

(22) PCT Filed: Mar. 24, 2009

(86) PCT No.: PCT/JP2009/055770
§ 371 (c)(1),
(2), (4) Date: Sep. 30, 2010

(87) PCT Pub. No.: WO2009/122954
PCT Pub. Date: Oct. 8, 2009

(65) Prior Publication Data
US 2011/0029197 A1    Feb. 3, 2011

(30) Foreign Application Priority Data

Apr. 2, 2008 (JP) .................................. 2008-096502

(51) Int. Cl.
*B60G 17/018* (2006.01)

(52) U.S. Cl.
USPC .................................. 701/37; 318/135; 703/2

(58) Field of Classification Search
USPC ........ 701/36–40; 703/2; 318/135; 280/5.514; 310/26
See application file for complete search history.

(56) References Cited

U.S. PATENT DOCUMENTS

| 5,060,959 A | 10/1991 | Davis et al. |
| 5,301,111 A | 4/1994 | Utsui et al. |

(Continued)

FOREIGN PATENT DOCUMENTS

| EP | 0 616 412 A1 | 9/1994 |
| EP | 0 632 568 A1 | 1/1995 |

(Continued)

OTHER PUBLICATIONS

Lu et al, A Miniature Short Stroke Linear Actuator—Design and Analysis, IEEE Transactions on Magnetics, vol. 44, Iss. 4, 2008, pp. 497-504.*

(Continued)

*Primary Examiner* — Russell Frejd
(74) *Attorney, Agent, or Firm* — Foley & Lardner LLP

(57) ABSTRACT

It is a task of the invention to obtain a favorable thrust force characteristic with respect to a stroke of an actuator even if the actuator is used in a thrust force control. To solve the task, in the present invention, a linear motor type electrically-powered actuator AC with a linear motor 3 as a drive section is drivingly controlled. With a basic thrust force variation with respect to the stroke in a non-excitation state as a basis, a thrust force command Fc is used to correct a phase of the basic thrust force variation and a magnitude thereof to determine a compensation quantity which corresponds to the thrust force variation with respect to the stroke.

9 Claims, 12 Drawing Sheets

U.S. PATENT DOCUMENTS

| | | | |
|---|---|---|---|
| 5,701,039 A | 12/1997 | Parison et al. | |
| 5,705,863 A * | 1/1998 | Teter | 310/26 |
| 6,208,497 B1 * | 3/2001 | Seale et al. | 361/160 |
| 6,294,849 B1 * | 9/2001 | Teter | 310/26 |
| 6,982,502 B1 * | 1/2006 | Sendaula et al. | 310/26 |
| 7,276,866 B2 * | 10/2007 | Asano | 318/135 |
| 2001/0043450 A1 * | 11/2001 | Seale et al. | 361/160 |
| 2005/0012405 A1 * | 1/2005 | Yajima et al. | 310/14 |
| 2006/0170888 A1 | 8/2006 | Asano | |
| 2006/0171091 A1 * | 8/2006 | Seale et al. | 361/160 |
| 2006/0181158 A1 | 8/2006 | Tajima et al. | |

FOREIGN PATENT DOCUMENTS

| | | |
|---|---|---|
| EP | 1 496 603 A2 | 1/2005 |
| JP | 5-248407 A | 9/1993 |
| JP | 6-170909 A | 6/1994 |
| JP | 11-299277 A | 10/1999 |
| JP | 2001-197765 A | 7/2001 |
| JP | 2002-48189 A | 2/2002 |
| JP | 2002-223582 A | 8/2002 |
| JP | 2003-88159 A | 3/2003 |
| JP | 2005-106242 A | 4/2005 |
| JP | 2006-187079 A | 7/2006 |
| JP | 2006-238663 A | 9/2006 |
| JP | 2008-62738 A | 3/2008 |

OTHER PUBLICATIONS

Kato et al, High Speed and High Precision Linear DC Solenoid Servo System, 30$^{th}$ Annual Conference of IEEE Industrial Electronics Society, 2004, pp. 371-376.*

Yamamoto et al, High Precision Electrostatic Actuator with Novel Electrode Design, The Eleventh Annual International Workshop on Micro Electro Mechanical Systems, 1998, pp. 408-413.*

Woo et al, A Simulation of the Thrust Force in Linear Actuator for Information Technology Applications, IEEE International Conference on Electrical Machines and Systems, 2007, pp. 1704-1707.*

* cited by examiner

ELECTRICALLY-POWERED ACTUATOR DRIVING CONTROL APPARATUS AND DRIVING CONTROL METHOD AND VEHICLE HAVING ELECTRICALLY-POWERED ACTUATOR DRIVING CONTROL APPARATUS

TECHNICAL FIELD

The present invention relates to driving control apparatus and driving control method which drivingly control a linear motor type electrically-powered actuator with a linear motor as a drive section.

BACKGROUND ART

Linear motion type electrically-powered actuators include an actuator using a linear motor. It should, herein, be noted that the linear motor is constituted by an array of permanent magnets and coils. As a driving control method of the electrically-powered actuator with such a linear motor as described above as a drive section, for example, a control method described in a patent document 1 has been proposed.

It should, herein, be noted that, as described in patent document 1, a static thrust force distribution with respect to a relative displacement (stroke) of an output shaft has a positive inclination. With having the positive inclination taken into consideration, in the control method of patent document 1, a current compensation to compensate for a detent force which is a static thrust force at a time of a non-excitation is performed according to the stroke quantity of the actuator.

Patent document 1: A Japanese Patent Application First Publication Heisei 5-248407.

DISCLOSURE OF THE INVENTION

In the technique described in above-described patent document 1, a position command for the electrically-powered actuator is converted into a current command value to the motor. In addition, a current compensation quantity dependent upon a stroke quantity is determined and this current compensation quantity is subtracted from the above-described current command value. This reduces a thrust force variation. Consequently, a flat thrust force characteristic with respect to the stroke of the actuator is obtained. However, inventors and so forth confirmed that, depending upon the thrust force generated at the electrically-powered actuator, the flat thrust force characteristic with respect to the stroke could not be obtained when the current compensation is made only for the thrust force variation with respect to the stroke at a time of non-excitation state.

It is, in view of the above-described point, a task of the present invention to provide a favorable thrust force characteristic with respect to a stroke of the actuator.

In order to solve the above-described task, according to the present invention, when the linear motor type electrically-powered actuator with the linear motor as the drive section is drivingly controlled, the compensation quantity to compensate for the thrust force variation with respect to the stroke of the actuator is determined with the thrust force generated at the actuator taken into consideration.

According to the present invention, when the compensation quantity to compensate for the thrust variation with respect to the stroke of the actuator is determined, the thrust force generated at the actuator is taken into consideration. Thus, it becomes possible to obtain the favorable thrust force characteristic with respect to the stroke.

Figure 1:
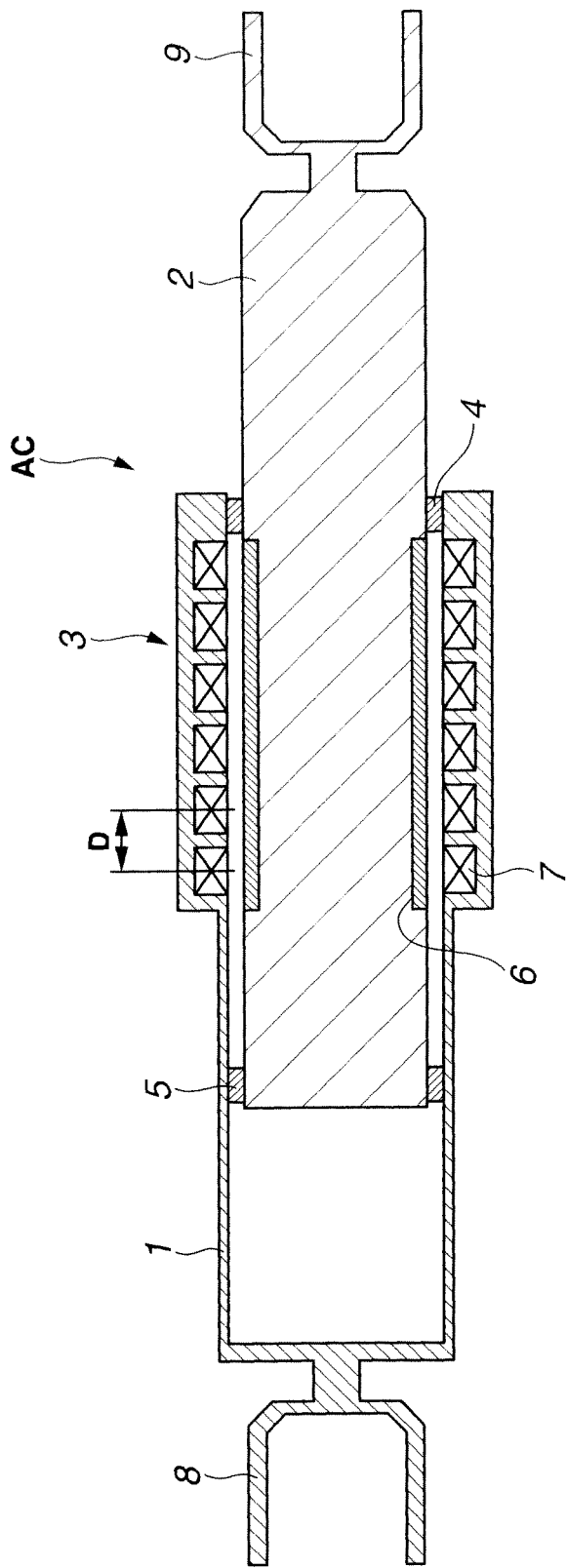
FIG. 1 is an explanatory view of an electrically-powered actuator related to a first embodiment according to the present invention.

EXPLANATION OF SIGNS 1 cylinder
2 rod
3 linear motor
7 coils
10 fixture member 11 movable body
12 potentiometer
20 driving control apparatus
21 thrust force command calculation section
22 thrust force compensation section (compensation quantity calculation means)
22A phase gain calculation section
22B compensation quantity calculation section
22C addition section
22D phase correction section
22E basic compensation quantity determination section
22F gain correction section
23 supply current adjustment section
AC actuator
Fc thrust force command
x stroke
G gain
α phase
ΔF compensation quantity
M calculation map

BEST MODE FOR CARRYING OUT THE INVENTION

Next, preferred embodiments according to the present invention will be described with reference to the drawings.
(Structure of Actuator)

First, a structure of a linear motor type electrically-powered actuator in a first preferred embodiment will be described. FIG. 1 shows a rough configuration representing an example of an electrically-powered actuator in which a linear motor 3 is used for a drive section. Electrically-powered actuator AC includes a cylinder 1, a rod 2, and a linear motor 3. Cylinder 1 is a bottomed cylindrical body having, for example, a circular shape in cross section. A part of rod 2 is retractably and advanceably inserted into cylinder 1. A cross sectional shape of rod 2 is the same cross sectional shape as an inner diameter surface of cylinder 1, for example, is circular in cross section.

A doughnut shaped guide 4 is coaxially fixed onto an inner diameter surface of cylinder 1 of cylinder at an opening end section side. An inner diameter surface of this guide 4 is slidably contacted on an outer diameter surface of rod 2. Another doughnut shaped guide 5 is coaxially fixed onto an end section at a bottom side of bottomed cylinder 1. An outer diameter surface of this guide 5 is slidably contacted on the inner diameter surface of cylinder 1. That is to say, above-described guides 4, 5 constitute a slide bearing and serve to support rod 2 and cylinder 1 to enable strokes of rod 2 and cylinder 1 mutually in an axial direction (relatively movable). That is to say, cylinder 1 is linearly movable along the axial direction of cylinder 1 relative to rod 2. Above-described linear motor 3 are so arranged that a ring shaped plurality of permanent magnets and a plurality of coils 7 are opposed against one another.

That is to say, plurality of permanent magnets 6 are fixed coaxially on the outer diameter surface of rod 2. Plurality of permanent magnets 6 are arrayed along an axis of rod 2. In addition, plurality of coils 7 are arrayed along the axis of cylinder 1. It should be noted that each coil 7 has an iron core. Actuator AC is driven according to a supply current (an excitation current) to coils 7. A bracket 8 is installed on a bottomed end section of cylinder 1. In the same way, a bracket 9 is installed on another end section of rod 2.

Figure 2:
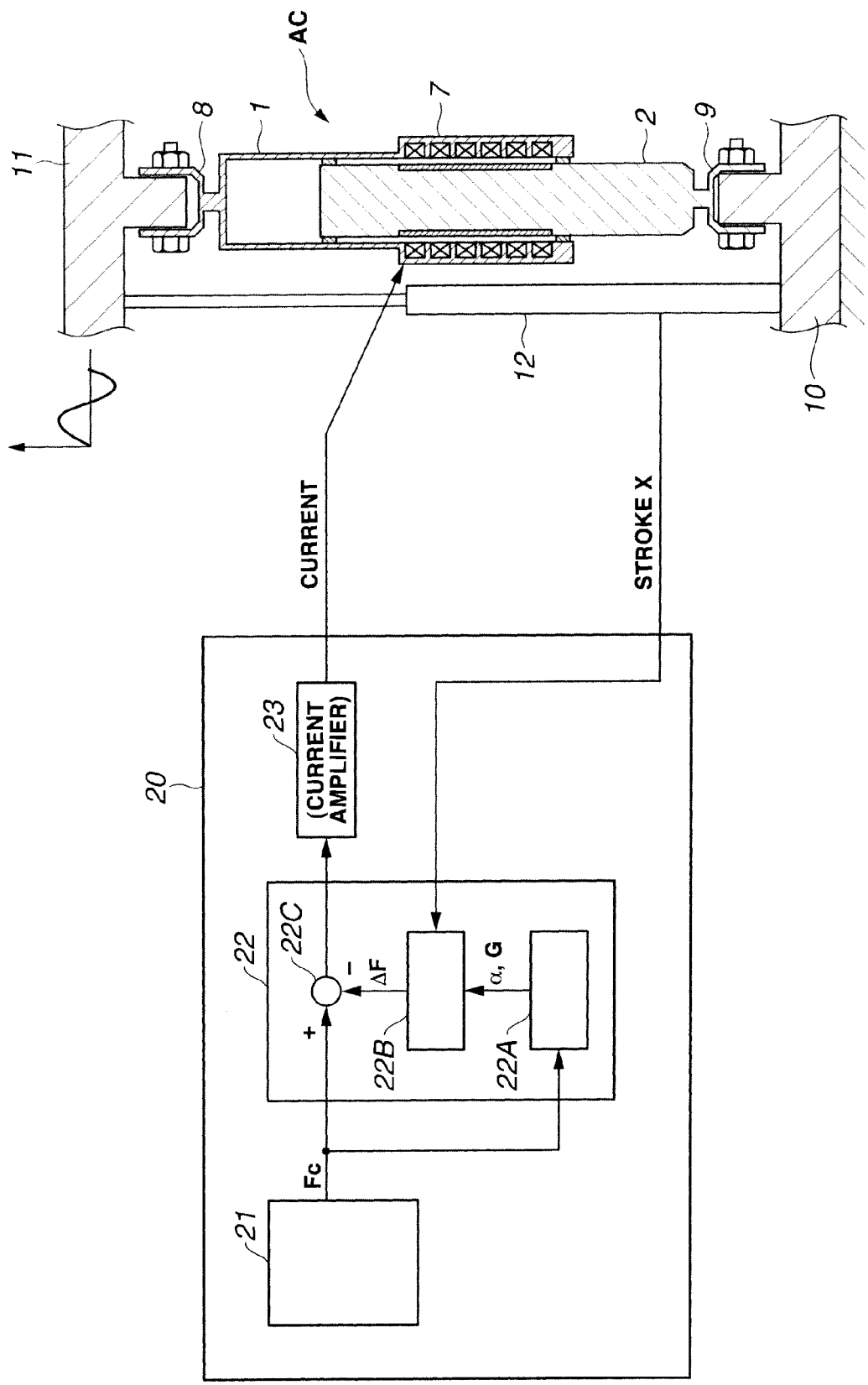
FIG. 2 is an explanatory view of a driving control apparatus related to the first embodiment according to the present invention.

In this embodiment, rod side 2 is supposed to be a fixture section and a cylinder side 1 is supposed to be a movable section. Then, as shown in FIG. 2, electrically-powered actuator AC of the above-described structure is used with bracket 9 at rod side 2 linked to fixture member 10 and with the bracket at cylinder side 1 linked to a movable body 11. In this embodiment, a vibration force is supposed to be received by movable body 11 in an upward-and-downward direction (a stroke direction of actuator AC or an approximately stroke direction thereof) according to a vibration input from an external. Then, it is supposed that a suppression of vibration of movable body 11 is carried out according to a thrust force generated at actuator AC. It should be noted that fixture member 10 is, for example, fixed onto a surface plate and movable body 11 is, for example, an equipment or so forth required for the suppression of vibration. In a case of the suppression of vibration, generating the thrust force which cancels the vibration while making a stroke motion is required for actuator AC.

In addition, position detecting means for detecting a relative displacement of rod 2 with respect to cylinder 1, namely, a stroke quantity is provided. Position detecting means outputs a detected position signal to a driving control apparatus. In this embodiment, as the position detecting means, a potentiometer 12 is exemplified which detects the stroke quantity of actuator AC. In addition, an acceleration sensor which detects an upward-and-downward directional acceleration of movable body 11, a speed sensor which detects a displacement speed of the upward-and-downward direction, and so forth are provided. Each sensor outputs its detection signal to driving control apparatus 20.

(Compensation for a Thrust Force Variation)

It should, herein, be noted that, prior to an explanation of driving control apparatus 20, a compensation for a thrust force variation will be explained.

Figure 3:
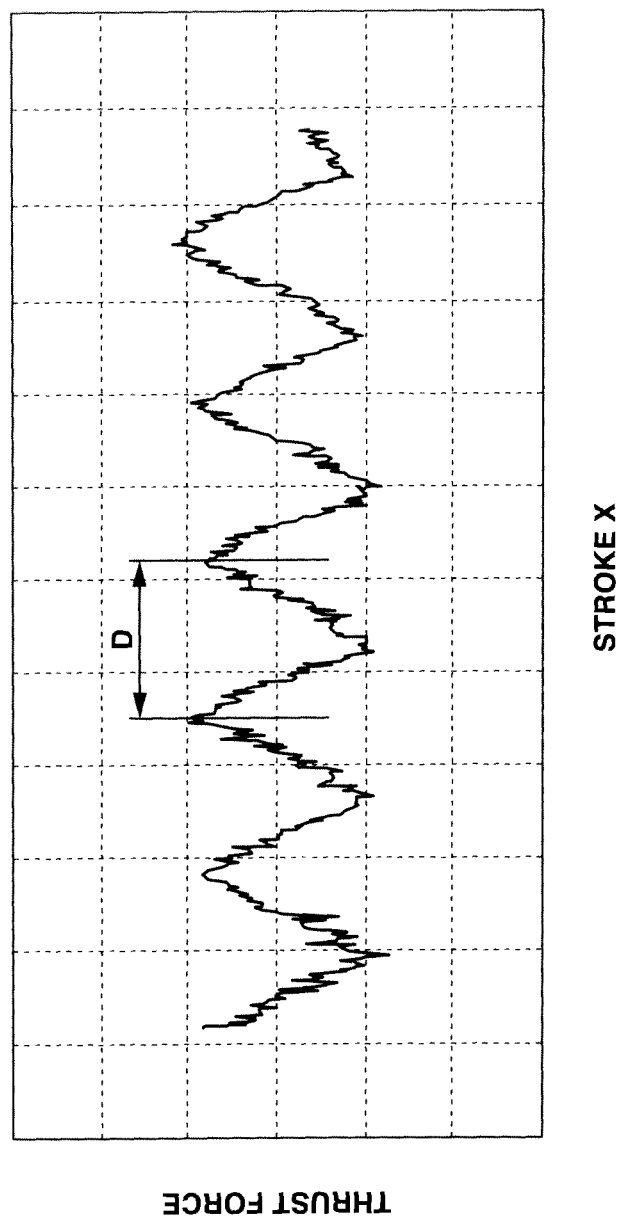
FIG. 3 is an explanatory view representing a thrust force variation with respect to a stroke in a non-excitation state.

As shown in FIG. 1, when linear motor 3 in which a plurality of permanent magnets 6 are discretely arranged in the stroke direction is used, the thrust force variation with respect to the stroke occurs even under a non-excitation state in which no current is caused to flow into coils 7. This thrust force variation is caused by mutual generations of attractive force and repulsive force between permanent magnet 6 and the iron cores of coils 7. A result of the thrust force variation actually measured in actual actuator AC is shown in FIG. 3. As shown in FIG. 3, in actuator AC in this embodiment, the thrust force is periodically varied with respect to the stroke. A variation period D of this variation is approximately equal to an arrangement interval D between two of respective coils 7 shown in FIG. 2.

The following problem rises when such a thrust variation as described above is developed. This problem is such that, in a case where actuator AC is used for a positioning purpose, this problem provides a cause of a reduction in a positioning accuracy and there is a possibility that control is in a divergence state, a feedback gain of the positioning becoming excessive. In addition, in a case where actuator AC is used for a thrust force generation purpose in a force control (a current control), the thrust force variation shown in FIG. 3 directly affects a thrust force to output. It is, therefore, difficult to obtain a stable thrust force.

It should be noted that it can be thought that an apparatus directly measuring the actually generated thrust force by means of a load cell may be provided to feedback the is actually generated thrust force in order to obtain a constant thrust force irrespective of the stroke position. However, in this case, a whole apparatus becomes complicated.

As described above, the thrust force variation with respect to the stroke in the non-excitation state is previously known. Hence, it is possible to calculate a current compensation quantity (namely, the thrust force variation shown in FIG. 3) dependent upon the stroke with the stroke quantity as a variable.

In this embodiment, the thrust force variation with respect to the stroke in the non-excitation state provides a basis for the compensation.

In addition, the thrust force variation with respect to the stroke can be expressed in a periodic function with the period as D.

For example, suppose that above-described current compensation quantity is $\Delta F$, this can be approximated using the following equation (1):

$$\Delta F = K \cdot \sin\{(2\pi/D) \cdot x\} \tag{1}$$

In the above equation, K denotes a basic amplitude of the thrust force variation.

Figure 4:
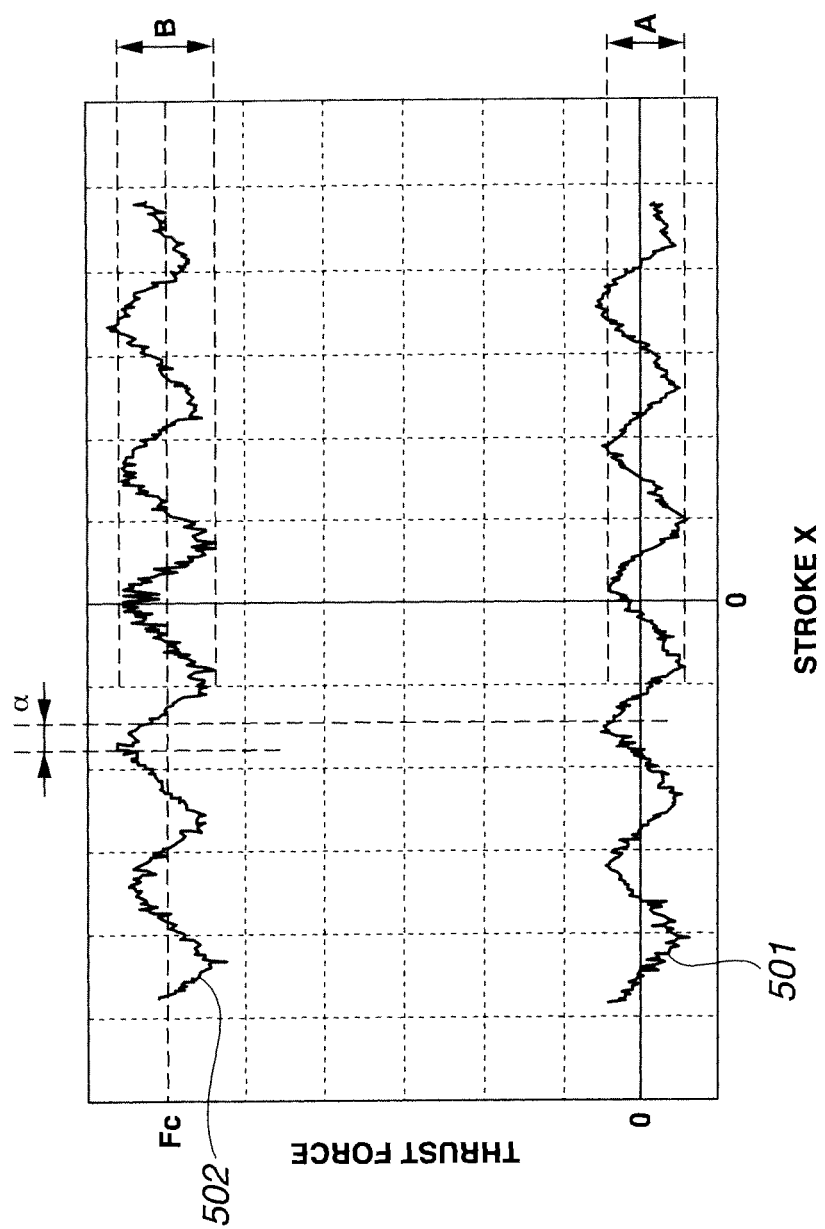
FIG. 4 is a graph representing variations in thrust force variation waveforms in a case where a thrust force command Fc is applied.

It should, herein, be noted that a result of measuring a thrust force characteristic with respect to the stroke while actuator AC is operated with a constant thrust force command Fc (a current command) is shown in FIG. 4. In FIG. 4, a lower side curve 501 denotes the characteristic of the thrust force at the time of non-excitation. An upper side curve 502 denotes the characteristic thereof in a case where the constant thrust force command Fc is applied.

As appreciated from FIG. 4, a thrust force variation waveform having an approximately same period as that at the time of the non-excitation state is indicated even if constant thrust force command Fc is applied. However, a phase difference a is developed between both of curves 501 and 502. In addition, a p-p value (peak-to-peak value) B of curve 502 during the development of the thrust force is larger than p-p value A of curve 501 during the non-excitation state.

As described above, the thrust variation with respect to the stroke has a phase deviation and a magnitude variation dependent upon the thrust force developed at actuator AC. That is to say, in a case where an actuator AC is used in a thrust force control, an influence of this phase deviation and deviation of the p-p value cannot be neglected and an influence on a control accuracy is developed.

Figure 5:
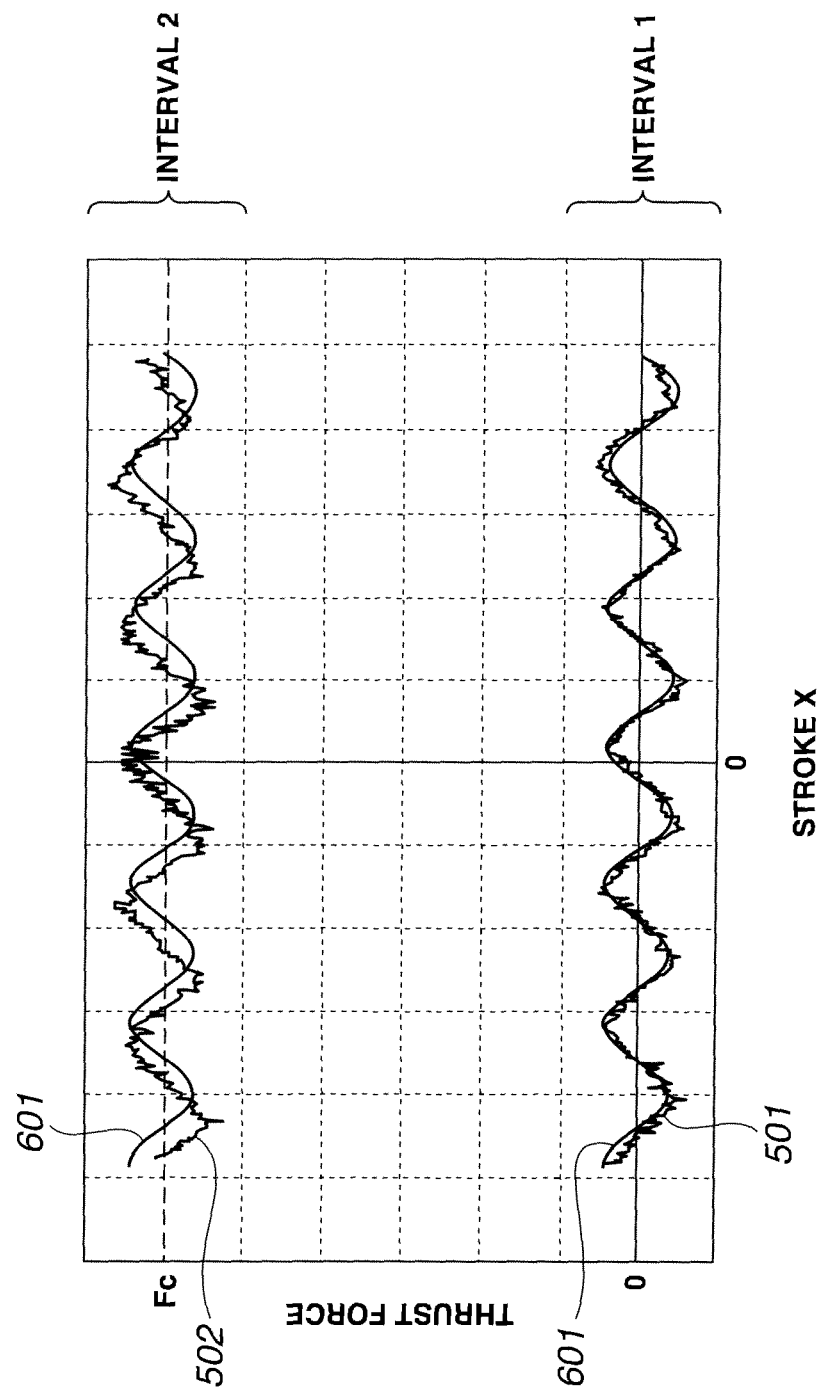
FIG. 5 is a graph representing a difference in the thrust force variation in a case where the thrust force command is issued and in a case of the non-excitation state.

FIG. 5 shows, all over again, curves 501, 502 indicating the thrust force variation at the time of non-excitation state and thrust force variation at the time of issuance of thrust force command Fc based on actually measured data. In addition, FIG. 5 shows an approximation curve 601 to which the thrust force variation at the time of non-excitation state is approximated is overlapped on the upside and downside waveforms. Curve 601 in FIG. 5 is an approximation curve to which thrust force variation curve 501 at the time of non-excitation state is approximated. It should be noted that curve 601 is a result of a curve approximation using a trigonometric function. This approximation curve 601 corresponds to a thrust force (current) compensation quantity in accordance with an actuator AC stroke at the time of the non-excitation state. However, it is appreciated that the phase deviation from thrust force variation curve 502, as described above, occurs.

Figure 6:
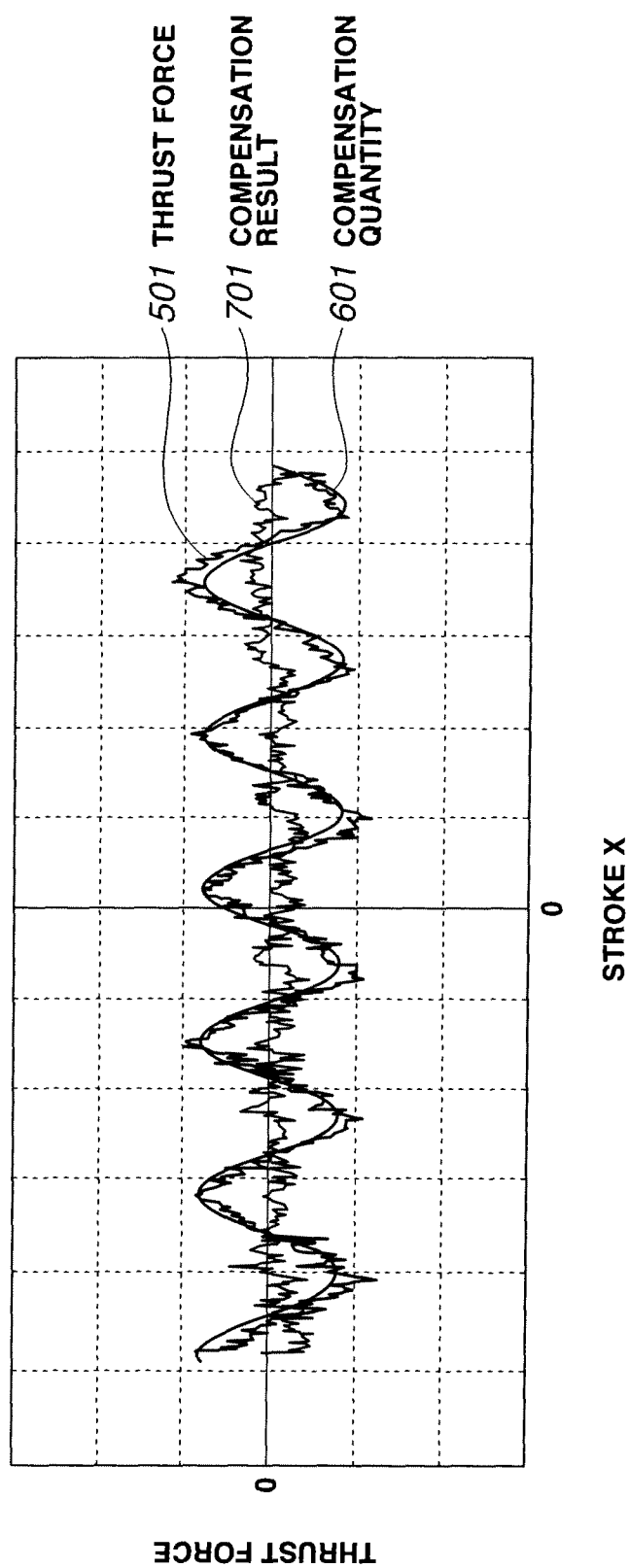
FIG. 6 is a graph representing a thrust force compensation quantity and a compensation result in the non-excitation state.

FIG. 6 is an expansion drawing for a part of an interval 1 in FIG. 5. A thrust force compensation quantity according to above-described approximation curve 601 is subtracted from the thrust force variation curve at the time of non-excitation state 501 to calculate an actual current command for actuator AC. Thus, the thrust force characteristic with respect to the stroke indicates the characteristic shown in curve 701. That is to say, it is appreciated that the thrust variation can be cancelled.

Figure 7:
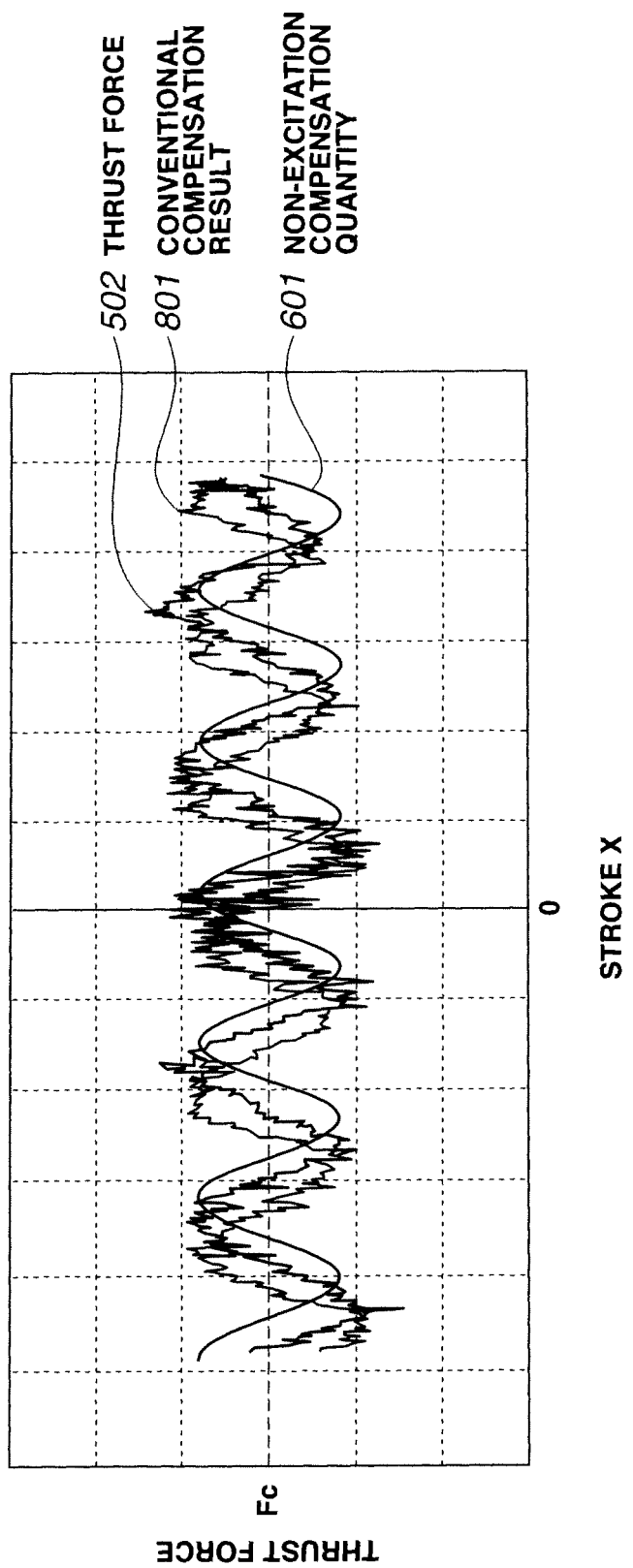
FIG. 7 is a graph for explaining the thrust compensation quantity and the compensation result in a case where no correction by the thrust force is made, in a case where thrust force command Fc is applied.

On the other hand, FIG. 7 shows an expansion drawing for a part of an interval 2 in FIG. 5. Due to the phase deviation of non-excitation compensation quantity 601 with respect to thrust force variation curve 502 in a case of no compensation, the trust force variation cannot almost be cancelled as shown by a compensated curve 801 in a case where the compensation is performed.

Figure 8:
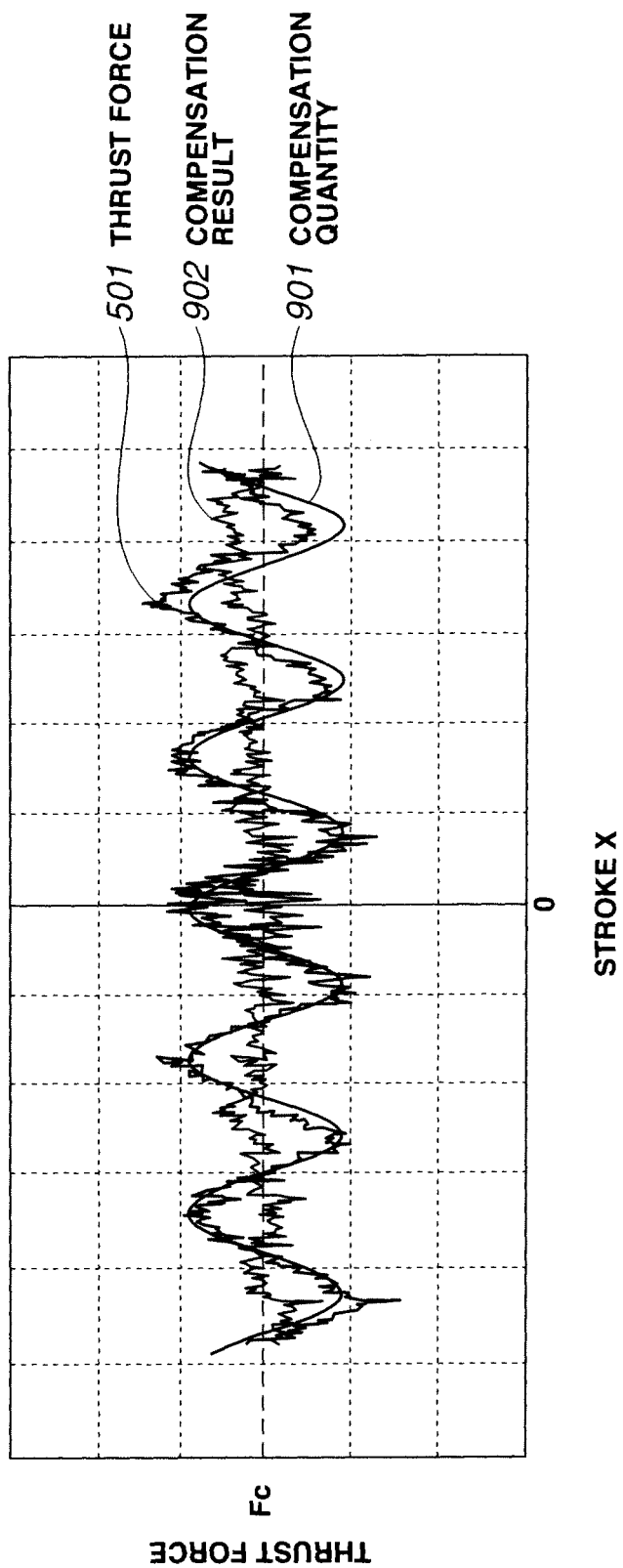
FIG. 8 is a graph for explaining the thrust force compensation quantity and the compensation result in a case where the correction by the thrust force is made, in a case where thrust force command Fc is applied.

On the other hand, if the phase of non-excitation compensation quantity 601 is deviated or its magnitude of non-excitation compensation quantity 601 is corrected on a basis of the thrust force command, the thrust force variation can be cancelled as shown in FIG. 8.

Figure 9:
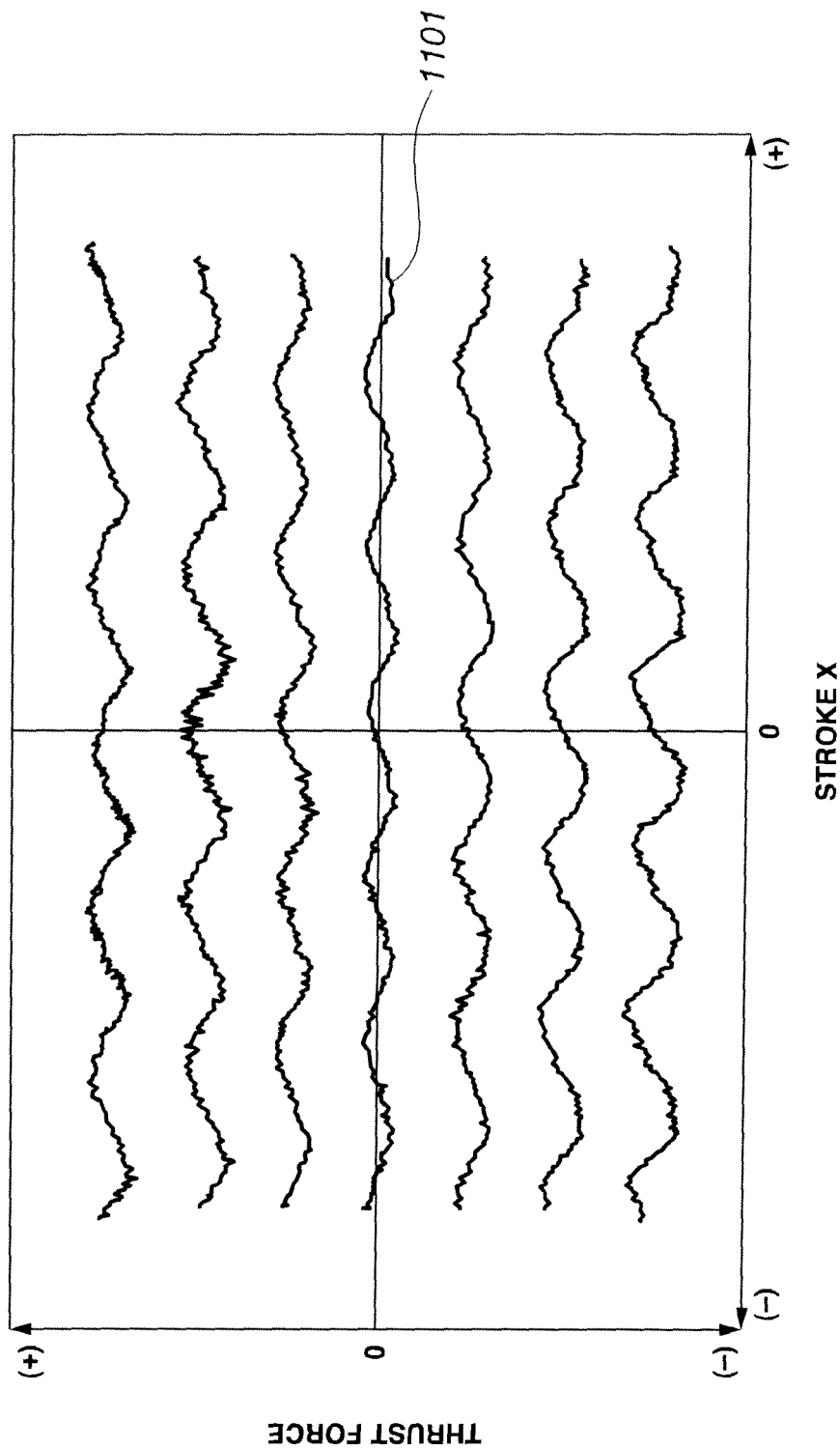
FIG. 9 is a graph representing the variation of the thrust force variation waveform.

It should be noted that FIG. 9 shows thrust force characteristics in a case where the thrust force command is varied. That is to say, FIG. 9 is measurement examples of the stroke-to-thrust force characteristics in a case where constant thrust forces (currents) are applied to actuator AC. A thrust force (+) denotes the thrust force in a direction in which actuator AC shown in FIG. 2 is expanded and thrust force (−) denotes the thrust force in a direction in which actuator AC shown in FIG. 2 is compressed. In the same way, stroke (+) direction is a direction in which actuator AC shown in FIG. 2 is expanded. Stroke (−) direction is a direction in which actuator AC shown in FIG. 2 is compressed. A curve 1101 represents the thrust force is variation during the non-excitation state.

As appreciated from the respective thrust force characteristics shown in FIG. 9, a magnitude of an amplitude of each thrust force characteristic is varied in accordance with an absolute value of the thrust force command for actuator AC. In the same way, it will be appreciated that the phase of each curve is varied in accordance with the thrust force command. In addition, it will be appreciated that, in the actuator form of this embodiment, the variations of the phase deviation and amplitude are approximately linearly varied according to the stroke quantity.

(Structure of Driving Control Apparatus 20)

In addition, driving control apparatus 20, as shown in FIG. 2, a thrust force command calculation section 21, a thrust force compensation section 22, and a supply current adjustment section 23.

Thrust force command calculation section 21 detects the acceleration and speed developed on movable body 11 on a basis of a signal from a sensor detecting a behavior of movable body 11, calculates the thrust force to be generated at actuator AC to suppress a fluctuation of movable body 11 on a basis of their detection results, and outputs this thrust force command Fc as the current command. A well known calculation of the control of the suppression of vibration may be applied to the above-described calculation of thrust force command Fc.

In addition, above-described thrust force compensation section 22 includes: a phase gain calculation section 22A; a compensation quantity calculation section 22B; and an addition section 22C. Phase gain calculation section 22A calculates a phase and a gain to correct a basic is compensation quantity which is a basis of correction on a basis of the thrust force to be generated at actuator AC. In phase gain calculation section 22A in this embodiment, thrust force command Fc from thrust force command calculation section 21 is inputted as the thrust force to be developed at actuator AC. Then, correction purpose phase α and gain G are derived on a basis of the following equations (2) and (3). The derived phase α and gain G are outputted to compensation quantity calculation section 22B.

$$\alpha = A1 \cdot Fc - A2 \tag{2}$$

$$G = G1 \cdot |Fc| + G2 \tag{3}$$

Above-described respective A1, A2, G1, and G2 denote constants dependent upon the characteristic of actuator AC used as an object.

It is possible for actuator AC in this embodiment to set the phase deviation and gain in a linear approximation with the thrust force characteristic at the time of the non-excitation state as a base. According to this, above-described equations (2) and (3) are linear expressions. Above-described equations (2) and (3) may be determined empirically in accordance with the characteristic of actuator AC used as the object.

Next, a process of compensation quantity calculation section 22B will be explained. As described above, the compensation quantity of the thrust force variation with respect to the stroke at the time of the non-excitation state can be approximated to the trigonometric function.

That is to say, as described above, in actuator AC in this embodiment, basic thrust force variation ΔF with respect to the stroke at the time of the non-excitation state can be expressed in the following equation (1).

$$\Delta F = K \cdot \sin\{(2\pi/D) \cdot x\} \tag{1}$$

On a basis of equation (1), the following equation (4) can be obtained by reflecting the correction on the equation (1) with phase α and gain G inputted from phase gain calculation section 22A. That is to say, current compensation quantity ΔF after the correction by the thrust force generated at actuator AC can be determined according to equation (4).

$$\Delta F = G \cdot \sin\{(2\pi/D) \cdot (X - \alpha)\} \tag{4}$$

It should, herein, be noted that above-described basic amplitude K is included in above-described gain G in equation (4). That is to say, G represents the amplitude (gain) itself of the curve.

In addition, variable D in equation (4) denotes arrangement interval D of two of respective coils 7 shown in FIG. 1 as described above. Then, stroke X of actuator AC measured by potentiometer 12 is inputted into compensation quantity calculation section 22B. Then, compensation quantity calculation section 22B calculates a variation quantity of the thrust force, namely, current compensation quantity ΔF according to above-described equation (4) and outputs this ΔF to addition section 22C.

Addition section 22C subtracts variation quantity ΔF from thrust force command Fc and outputs thrust force command Fc after the subtraction to supply current adjustment section 23.

It should be noted that supply current adjustment section 23 is constituted by a current amplifier and amplifies thrust command Fc which is an input current command value and applies (supplies) the amplified current command value to coils 7 of actuator AC. It should be noted that, in the above is described structure, thrust force command Fc itself is a current command and supply current adjustment section 23 is constituted by the current amplifier. In a case where thrust force command Fc inputted to supply current adjustment section 23 is not the current command, supply current adjustment section 23 is constituted by a motor drive apparatus which adjusts the current supplied to coils 7 from a power supply to a current value in accordance with inputted thrust command Fc. It should, herein, be noted that thrust force compensation section 28 constitutes compensation quantity calculation means.

(Operation)

A thrust force command Fc generated at actuator AC is calculated in accordance with a situation of movable body 11. In addition, when the compensation quantity in accordance with the stroke of actuator AC is determined, the phase and gain of the basic compensation quantity are corrected in accordance with above-described thrust force command Fc. That is to say, the thrust force variation with respect to the stroke is determined with the thrust force developed at actuator AC taken into consideration. Then, the current in accordance with thrust force command Fc after the compensation by the subtraction of the thrust force variation is applied to coils 7 of actuator AC.

Thus, an ideal thrust force characteristic in which the thrust force with respect to the stroke is not varied no matter how value the thrust force generated at actuator AC indicates or even if a target generated thrust force is varied according to a situation of movable body 11 can be obtained.

Advantages of the First Embodiment (1) The thrust force compensation quantity of actuator AC is determined not only on a basis of the stroke of actuator AC but also thrust force command Fc. Thus, it becomes possible to calculate appropriately thrust force compensation quantity ΔF even in states except the non-excitation state and the thrust force variation with respect to the stroke of actuator AC can effectively be cancelled. Consequently, the ideal thrust force characteristic in which the thrust force with respect to the stroke is not varied can be obtained.

(2) The phase of basic compensation quantity ΔF is corrected on a basis of thrust force Fc generated at actuator AC. Thus, the thrust force compensation quantity which absorbs the variation of the phase of the thrust force variation with respect to the stroke of actuator AC in states except the non-excitation state can appropriately be calculated. Consequently, the thrust force variation with respect to the stroke of actuator AC can effectively be cancelled.

(3) The gain (amplitude) of the basic compensation quantity is corrected on a basis of the thrust force generated at actuator AC. Thus, it becomes possible to calculate appropriately the thrust force compensation quantity which absorbs the variation in the amplitude of the thrust force variation with respect to the stroke of actuator AC in the states except the non-excitation state. Consequently, the thrust force variation with respect to the stroke of actuator AC can effectively be cancelled.

(4) The basic compensation quantity is expressed in a function related to the stroke of actuator AC. The thrust variation with respect to actuator AC can precisely be expressed.

(Modification)

Figure 11:
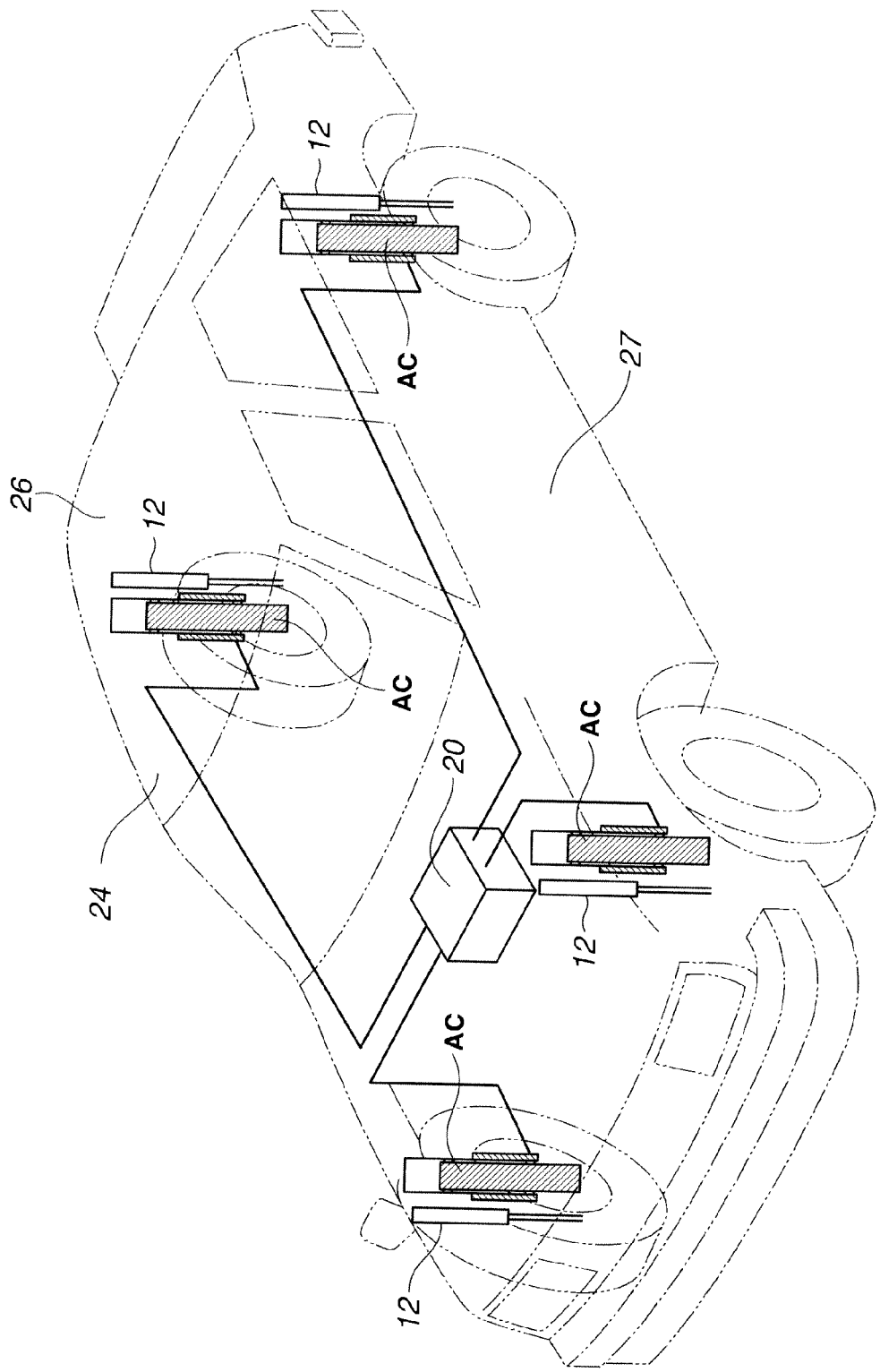
FIG. 11 is an explanatory view representing a whole vehicle to which electrically-powered actuator related to the first or second embodiment according to the present invention is applicable as a suspension.
Figure 12:
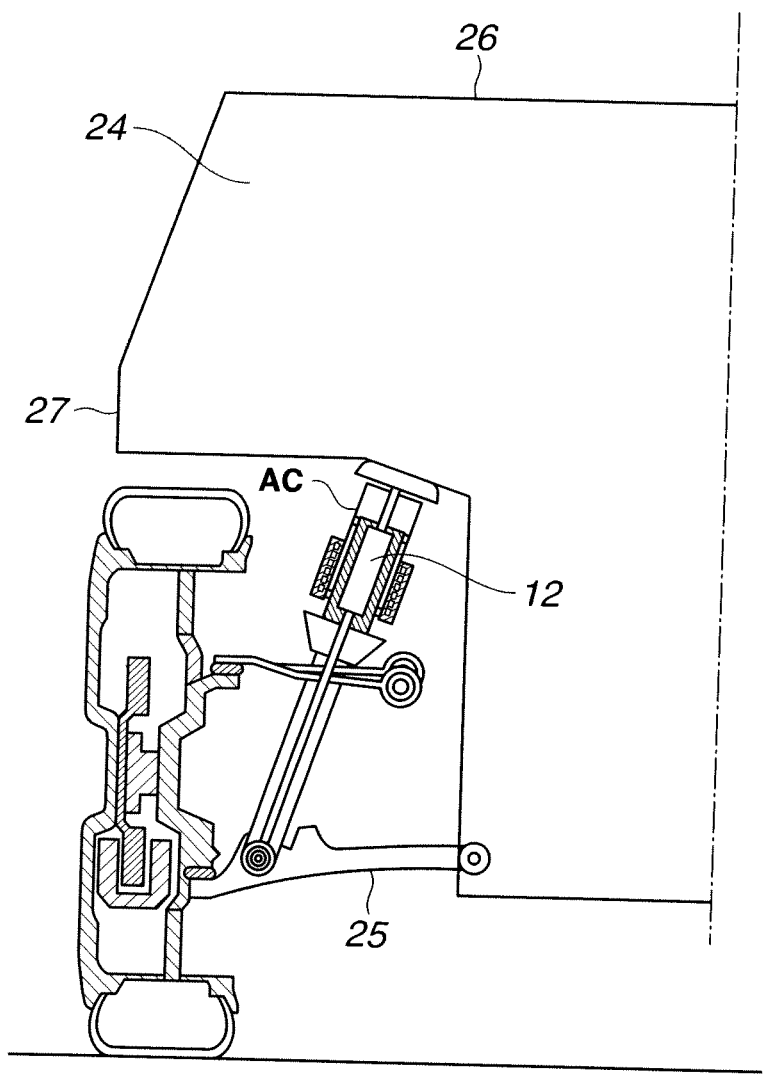
FIG. 12 is an explanatory view of a vehicle to which electrically-powered actuator related to the first or second embodiment according to the present invention is applicable as the suspension as viewed from a front portion of the vehicle.

(1) Potentiometer 12 is disposed between movable body 11 and fixture member 10 as position detecting means. In a case where this actuator AC is used as, for example, a suspension in an automotive vehicle, movable body 11 corresponds to a vehicle body 24 and fixture member 10 corresponds to a suspension arm 25 as shown in FIGS. 11 and 12. In a case where actuator AC is utilized as the suspension, potentiometer 12 may be disposed between suspension arm 25 and vehicle body 24 as shown in FIGS. 11 and 12. Or alternatively, although not shown, a sensor to detect a swing angle of the suspension may be installed and the position detecting means may be constituted by means for converting the output value of this sensor into the stroke of actuator AC. It should, herein, be noted that the vibration applied to vehicle body 24 and to suspension arm 25 is easily transmitted to a roof 26, a door 27, or so forth constituting a vehicular passenger compartment. Hence, there is a possibility that the transmitted vibration itself or sound caused by the vibration gives an unpleasant feeling to vehicular occupants. Thus, in a case where actuator AC is linked between vehicle body 24 and suspension arm 25 as described above, the trust force variation with respect to the stroke of actuator AC is developed. At this time, fluctuation and abnormal sound are developed within the passenger compartment so that there is a possibility that the unpleasant feeling is given to the vehicular occupant. Thus, if the thrust force variation with respect to the stroke of actuator AC is reduced, the fluctuation and abnormal sound within the passenger compartment can effectively be reduced.

(2) As a usage example of actuator AC, a case where the suppression of vibration of equipment is exemplified. However, an application example of electrically-powered actuator AC is not limited to this. For example, it can be expected that electrically-powered actuator AC is used with actuator AC attached to a part of the automotive vehicle suspension as an active suspension to absorb appropriately recess-and-convex of a road surface. In such an application as described above, actuator AC is used not only for the positioning control in which an object is carried or fixed at an appropriate position but also for a thrust force control in which a damping force or an active control force is generated.

(3) In the above-described embodiment, the current value which corresponds to thrust force command Fc as the thrust force generated at actuator AC. As the thrust force generated at actuator AC, thrust force command itself may be used. It should be noted that it is possible to measure and use the thrust force actually developed at actuator AC. However, the apparatus itself becomes accordingly complicated.

(4) In the above-described embodiment, as the basic thrust force variation which provides a base for the correction of the phase and the gain, the thrust force variation with respect to the stroke in a case of the non-excitation state, namely, in the case of a zero thrust force command Fc is used. The basic thrust force variation which provides the base may be the trust force variation with respect to the stroke under a predetermined thrust force command Fc. For example, a center value of a thrust force range generated at actuator AC or a thrust force variation with respect to the stroke at the thrust force in which a time for which the thrust force variation is developed is longest may be the basic thrust force variation which provides the base.

(5) Both of the phase and gain are corrected for the basic thrust force variation which provides the base for the correction described above in the above-described embodiment. However, only the phase may be corrected. Or alternatively, only the gain may be corrected.

Second Embodiment

Next, a second preferred embodiment will be described with reference to the drawings. The same apparatuses and so forth as those in the first embodiment are designated with like reference numerals and explained below.

Figure 10:
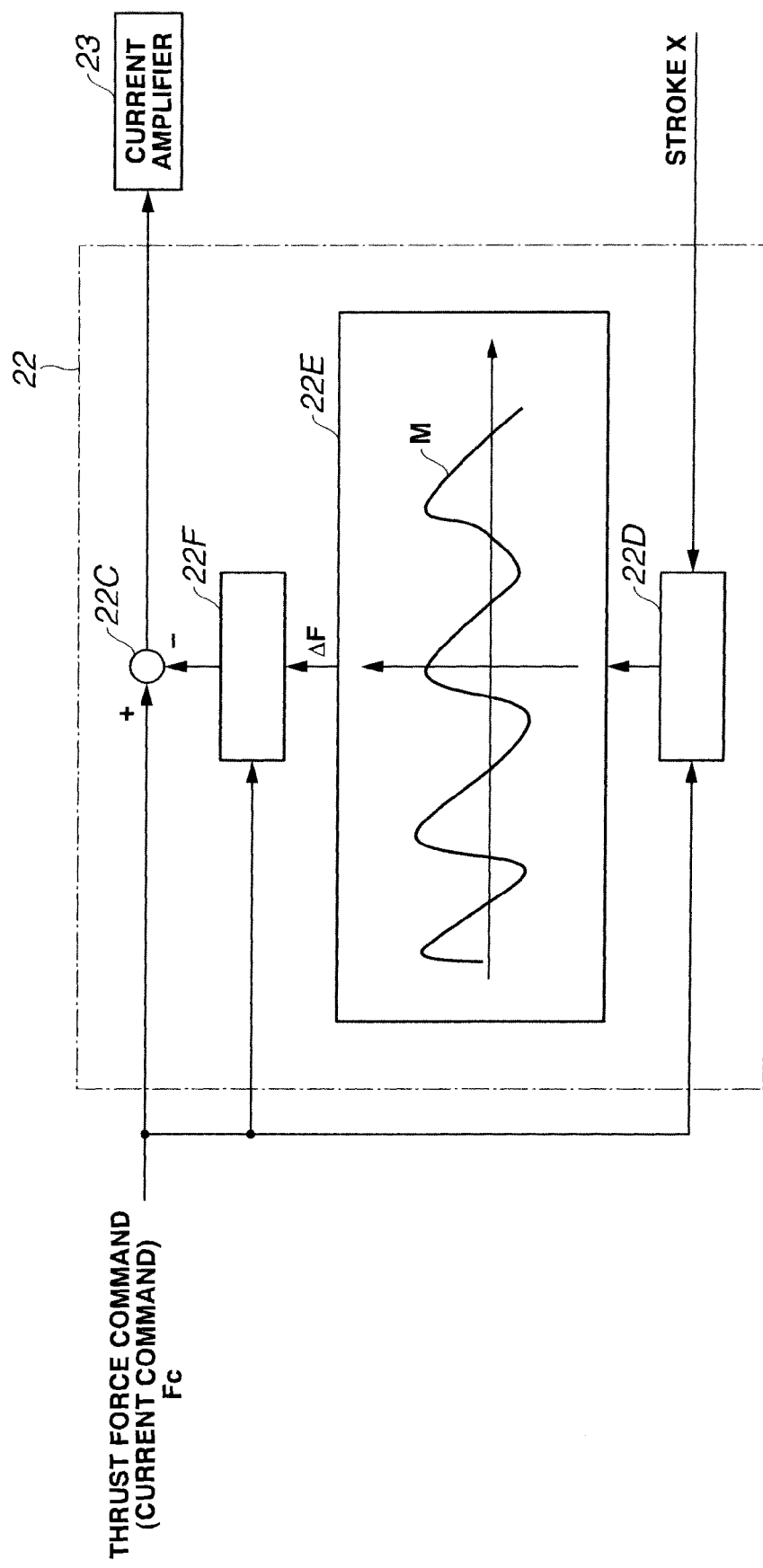
FIG. 10 is an explanatory view for explaining the compensation quantity calculation section related to a second embodiment according to the present invention.

A basic structure in this embodiment is the same as the first preferred embodiment. However, as shown in FIG. 10, a process in thrust force compensation section 22 is different. That is to say, as shown in FIG. 10, thrust force compensation section 22 in this embodiment includes: phase correction section 22D; a basic compensation quantity determination section 22E, a gain correction section 22F, and addition section 22C. In this embodiment, it is supposed that the thrust force characteristic of electrically-powered actuator AC which is used as the object cannot be expressed in a single trigonometric function as shown in FIG. 5 or cannot be expressed any more in a periodic function. In such cases described above, there is a possibility that the calculation becomes complicated in the previously described first embodiment. In such cases as described above, the structure of this second embodiment may more preferably be used.

Above-described basic compensation quantity determination section 22E is provided with a calculation map M to determine the basic compensation quantity which provides the base for the compensation. Compensation quantity ΔF corresponding to the inputted stroke position is determined from calculation map M and is outputted to gain correction section 22F. Above-described calculation map M is configured to store the thrust force variation when, for example, actuator AC makes the stroke motion in the non-excitation state in a form of a discrete numerical value matrix with respect to the stroke.

In addition, phase correction section 22D inputs the stroke detected from the position detection means and inputs thrust force command Fc. Then, the inputted stroke is offset in accordance with thrust force command Fc. The stroke quantity after the correction according to the offset is outputted to above-described compensation quantity determination section 22E.

The offset quantity in accordance with thrust force command Fc can be determined by a determination of the thrust force variation with respect to the stroke as shown in FIG. 9 for each of the trust forces generated at actuator AC, actuator AC form which is used as the object. The offset quantity in accordance with thrust force command Fc may be may be determined from a function or alternatively may be provided in form of a map with thrust force command Fc as a variable.

Gain correction section 22F determines gain G in accordance with an absolute value of thrust force command Fc. Then, this gain G is multiplied by compensation quantity ΔF inputted from basic compensation quantity determination section 22E and the magnitude of compensation quantity is corrected in accordance with thrust force command Fc and is outputted to addition section 22C. It should be noted that the magnitude in calculation map M may be normalized.

The gain in accordance with thrust force command Fc can be determined by the determination of the thrust force variation with respect to the stroke as shown in FIG. 5 for each of the thrust forces generated at actuator AC, for actuator AC form which is used as the object. The gain in accordance with thrust force command Fc may be provided I a form of a function or alternatively may be provided in a form of a map with thrust force command Fc as the variable. Addition section 22C subtracts the inputted compensation quantity from thrust force command Fc generated at actuator AC and outputs the subtraction result to the current amplifier.

The other structures are the same as those in the first embodiment.

Advantage of the Second Embodiment (1) A basic advantage of the second embodiment is the same as the first embodiment.

(2) The compensation quantity which provides the base for the compensation is represented in predetermined map M related to the stroke of actuator AC. Consequently, the thrust force variation with respect to actuator AC can be expressed in a concise form.

Especially, the thrust force characteristic provided in a map format is effective in a case where the thrust force characteristic cannot be expressed in the single trigonometric function or cannot be expressed in the periodic function.

(Modification)

(1) In this embodiment, the trust force variation when making the stroke motion for actuator AC in the non-excitation state is stored in the form of map M as the thrust force variation which provides the base for the compensation. However, the waveform of the thrust force variation stored in calculation map M which provides the base for the compensation may not be that in the non-energized state. Phase correction section 22D and gain correction section 22F may be set for this waveform.

(2) In addition, although only the waveform which provides the base for the compensation is stored in calculation map M, a plurality of waveforms may be stored in calculation map M. For example, with all of graphs shown in FIG. 9 stored in calculation map M, an intermediate command value between the waveforms may be interpolated by a method of a linear interpolation between each of waveforms. In this case, the stroke and thrust force command Fc are inputted to basic compensation quantity determination section 22E so that the compensation quantity can be determined with the above-described two as the variables. That is to say, phase correction section 22D and gain correction section 22F can be omitted.

What is claimed is:
1. A driving control apparatus for an electrically-powered actuator, the driving control apparatus drivingly controlling the electrically-powered actuator according to a current supplied to coils of a linear motor, the electrically-powered actuator being a linear motor electrically-powered actuator with the linear motor as a drive section, the driving control apparatus comprising:
an electronic controller having:

a thrust force command calculation section configured to calculate a thrust force command value of a thrust force that the actuator generates by exciting the linear motor;

a position detector configured to detect a stroke of the actuator; and a compensation quantity calculation section configured to calculate a compensation quantity corresponding to a thrust force variation of the actuator on a basis of the stroke and the thrust force command value.

2. The driving control apparatus for the electrically-powered actuator as claimed in claim 1 wherein the compensation quantity calculation section is configured to correct a phase of the compensation quantity of the thrust force variation with respect to the stroke according to the thrust force command value when the compensation quantity is calculated on a basis of the stroke.

3. The driving control apparatus for the electrically-powered actuator as claimed in claim 1, wherein the compensation quantity calculation section is configured to correct a magnitude of the compensation quantity of the thrust force variation with respect to the stroke according to the thrust force command value when the compensation quantity is calculated on a basis of the stroke.

4. The driving control apparatus for the electrically-powered actuator as claimed in claim 1, wherein a basic compensation quantity of the compensation quantity for the thrust force variation with respect to the stroke is provided in advance in a form of a function or a map with a relative displacement of a movable section of the actuator as a variable.

5. The driving control apparatus for the electrically-powered actuator as claimed in claim 1, wherein the compensation quantity calculation section is configured to calculate the compensation quantity on a basis of the thrust force variation with respect to the stroke of the actuator in a case where the thrust force command value is zero.

6. The driving control apparatus for the electrically-powered actuator as claimed in claim 1, wherein the electrically-powered actuator is linked to a vehicle body and a suspension arm linked between a road wheel and the vehicle body and the thrust force generated at the actuator is a force in accordance with a relative speed or a relative displacement between the road wheel and the vehicle body.

7. A driving control method for an electrically-powered actuator, the driving control method drivingly controlling the electrically-powered actuator having a linear motor with the linear motor as a drive section, the driving control method comprising:

calculating, with an electronic controller, a thrust force command value of a thrust force that the actuator generates by exciting the linear motor;

detecting, with the electronic controller, a stroke of the actuator; and calculating, with the electronic controller, a compensation quantity corresponding to a thrust force variation of the actuator on a basis of the stroke and the thrust force command value to perform the compensation for the thrust force.

8. A vehicle in which a driving control apparatus for an electrically-powered actuator is equipped, the driving control apparatus drivingly controlling the electrically-powered actuator according to a current supplied to coils of a linear motor, the electrically powered actuator being a linear motor electrically-powered actuator with the linear motor as a drive section, the electrically-powered actuator linking a vehicle body and a suspension arm linked between the vehicle body and a road wheel and the driving control apparatus comprising:

an electronic controller having:
a thrust force command calculation section configured to calculate a thrust force command value of a thrust force that the actuator generates by exciting the linear motor;
a position detector configured to detect a stroke of the actuator; and
a compensation quantity calculation section configured to calculate a compensation quantity corresponding to a thrust force variation of the actuator on a basis of the stroke and the thrust force command value.

9. A driving control apparatus for an electrically-powered actuator, the driving control apparatus drivingly controlling the electrically-powered actuator according to a current supplied to coils of a linear motor, the electrically-powered actuator being a linear motor electrically-powered actuator with the linear motor as a drive section, the driving control apparatus comprising:

an electronic controller having:
a thrust force command calculation section configured to calculate a thrust force command value of a thrust force that the actuator generates by exciting the linear motor;
a position detector configured to detect a stroke of the actuator; and
a compensation quantity calculation section configured to calculate a compensation quantity corresponding to a thrust force variation of the actuator on a basis of the stroke and the thrust force command value, wherein the compensation quantity calculation section is configured to calculate a first compensation quantity on a basis of the stroke in a non-excitation state, and to correct the first compensation quantity on the basis of the thrust command value to determine the compensation quantity.

* * * * *